United States Patent
Riedel

(10) Patent No.: US 10,780,587 B2
(45) Date of Patent: Sep. 22, 2020

(54) OPERATING DEVICE FOR CONTROLLING OR PROGRAMMING A MANIPULATOR

(71) Applicant: KUKA Roboter GmbH, Augsburg (DE)

(72) Inventor: Martin Riedel, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 242 days.

(21) Appl. No.: 15/780,708

(22) PCT Filed: Dec. 12, 2016

(86) PCT No.: PCT/EP2016/080620
§ 371 (c)(1),
(2) Date: Jun. 1, 2018

(87) PCT Pub. No.: WO2017/102638
PCT Pub. Date: Jun. 22, 2017

(65) Prior Publication Data
US 2018/0345506 A1    Dec. 6, 2018

(30) Foreign Application Priority Data

Dec. 18, 2015 (DE) .................... 20 2015 008 715 U

(51) Int. Cl.
 *B25J 13/00* (2006.01)
 *B25J 9/16* (2006.01)
 (Continued)

(52) U.S. Cl.
 CPC ............. *B25J 13/06* (2013.01); *B25J 9/1653* (2013.01); *B25J 13/02* (2013.01); *G05B 19/19* (2013.01);
 (Continued)

(58) Field of Classification Search
 USPC .................................................. 700/245–264
 See application file for complete search history.

(56) References Cited

U.S. PATENT DOCUMENTS 4,408,286 A  * 10/1983  Kikuchi ................... B25J 9/046
                                                         318/568.14
5,021,969 A  *  6/1991  Okamura ............. G05B 19/427
                                                         700/261
(Continued)

FOREIGN PATENT DOCUMENTS

DE         4303264 C2    11/1998
EP         2012208 A2    1/2009

OTHER PUBLICATIONS

The English translation of the Korean Office Action, dated Dec. 14, 2019, in the related Korean Patent Appl. No. 10-2018-7017069.

(Continued)

*Primary Examiner* — Jonathan L Sample

(57) ABSTRACT

An operating device for controlling or programming a manipulator with six degrees of freedom that can be controlled independently from one another. The operating device includes three input arrangements which are each configured to specify a movement of the manipulator along an x-axis, y-axis or z-axis of the manipulator, and to specify a rotation of the manipulator about the x-axis, y-axis or z-axis of the manipulator. The three input arrangements are thereby respectively aligned along one of three main axes of the operating device.

18 Claims, 2 Drawing Sheets

(51) Int. Cl.
  *B25J 13/06* (2006.01)
  *B25J 13/02* (2006.01)
  *G05B 19/19* (2006.01)

(52) U.S. Cl.
  CPC .............. *G05B 2219/39436* (2013.01); *G05B 2219/40414* (2013.01)

(56) References Cited

U.S. PATENT DOCUMENTS

| | | | |
|---|---|---|---|
| 5,271,290 A | 12/1993 | Fischer | |
| 5,617,515 A * | 4/1997 | MacLaren | B25J 9/1656 414/5 |
| 5,767,648 A * | 6/1998 | Morel | B25J 9/1628 318/568.1 |
| 6,424,077 B1 | 7/2002 | Hata et al. | |
| 6,786,896 B1 * | 9/2004 | Madhani | B25J 9/1615 606/1 |
| 7,356,937 B2 * | 4/2008 | Nishibashi | B23Q 1/5462 33/502 |
| 2007/0282483 A1 * | 12/2007 | Kraft | B25J 13/02 700/245 |
| 2012/0179294 A1 * | 7/2012 | Sasai | B25J 9/1694 700/254 |
| 2013/0190926 A1 * | 7/2013 | Motoyoshi | B25J 9/1607 700/254 |
| 2014/0288703 A1 * | 9/2014 | Takagi | B25J 9/1633 700/245 |
| 2015/0114149 A1 * | 4/2015 | Gomi | B25J 5/00 74/89.14 |
| 2015/0120050 A1 * | 4/2015 | Gomi | B25J 9/162 700/258 |
| 2015/0127147 A1 * | 5/2015 | Yamazaki | B25J 9/1682 700/248 |
| 2015/0323398 A1 * | 11/2015 | Lauzier | G05B 19/423 73/862.08 |
| 2016/0221189 A1 * | 8/2016 | Nilsson | B25J 9/1653 |
| 2018/0345506 A1 * | 12/2018 | Riedel | B25J 9/1653 |

OTHER PUBLICATIONS

D1: Scientifica, "In Vivo (IVM) electrophysiology micromanipulators—Video demonstration," Internet: <https://www.youtube.com/watch?v=XLZSIXGiWH4, Sep. 17, 2013.

The English translation of the International Search Report and Written Opinion, dated Apr. 10, 2017, in the corresponding PCT Appl. No. PCT/EP2016/080620.

The European Communication, dated May 15, 2020, in the related European Appl. No. 16819464.5. (Translated Doc Translator).

* cited by examiner

OPERATING DEVICE FOR CONTROLLING OR PROGRAMMING A MANIPULATOR

CROSS-REFERENCE TO RELATED APPLICATIONS

This application is a National Stage Application of PCT/EP2016/080620, filed Dec. 12, 2016, which claims priority from German Utility Model Application No. 20 2015 008 715.9, filed Dec. 18, 2015.

1. TECHNICAL AREA

The present invention relates to an operating device for controlling or programming a manipulator, and a corresponding manipulator system, wherein the manipulator has six degrees of freedom that can be controlled independently from one another.

2. TECHNICAL BACKGROUND

Manipulators, and particularly robots, are universally usable, freely programmable handling devices. For example, a manipulator can comprise a plurality of axes which are movable independently from one another by motors. As a result, the manipulator can assume different poses or configurations in order to be able to reach different positions in the room with its tools or tool center point (TCP).

For that purpose, a manipulator can have a plurality of degrees of freedom. They can describe the number of driven movements which are independent from one another and which the manipulator can perform in the room in relation to a fixed world coordinate system. The degrees of freedom thus characterize the mobility of the manipulator.

In principle, many manipulators can move in two different ways in a coordinate system: The manipulator or TCP can be moved along one of the three Cartesian spatial directions and thus perform a straight-line translation. In such case, the main linear axes of the manipulator are usually parallel to the Cartesian directions of the reference coordinate system. In addition, a rotation around one of each of these axes can be effected.

A manipulator can follow an automatic program sequence. For that purpose, a corresponding control unit is provided with a preprogrammed program sequence which describes the individual points of travel that are supposed to be covered by the manipulator. In addition, a manual operation is also possible, in which the operator can move the manipulator manually. For example, an operating device can be used which can have freely assignable buttons which effect a continuous or incremental movement of the manipulator. Such an operating device is described, for example, in German Patent No. DE 4303264 C2 to Neugebauer, which granted on Nov. 26, 1998 and is hereby incorporated by reference in its entirety herein.

However, many operating devices are complicated and frequently only allow for an imprecise movement of the manipulator. Especially for inexperienced users, who rarely operate manipulators, the handling of such operating devices is a challenge. In particular, it is frequently not obvious for the operator as to how a desired translation and/or rotation can be specified or executed with the operating device.

The present invention thus addresses the problem of providing an operating device which significantly simplifies the manual operation of a manipulator. In particular, the movement of the manipulator is supposed to be specified in a highly precise and defined manner.

These and further problems, which shall become apparent from the following description, are solved by an operating device according to claim 1 and a manipulator system according to claim 11.

3. CONTENT OF THE INVENTION

The present invention relates to an operating device for controlling or programming a manipulator. The operating device can be operated manually by an operator. For example, the operating device can be operated by hand by the operator. The operating device can allow for the control of the manipulator in different coordinate systems, but can also be used to generate program sequences. For that purpose, the operating device can, for example, be in communication with a corresponding control unit of the manipulator and predefine movement specifications to the control unit, which can subsequently be implemented by the control unit. The manipulator has six degrees of freedom that can be controlled independently from one another. A desired movement guidance of a tool of the manipulator, for example, can be divided into a translational (position of the tool) and rotatory (orientation of the tool) movement specification.

The operating device has a first input arrangement which is configured to specify a movement of the manipulator along an x-axis of the manipulator, and to specify a rotation of the manipulator about the x-axis of the manipulator. In addition, the first input arrangement is aligned along a first main axis of the operating device.

The operating device further has a second input arrangement. It is configured to specify a movement of the manipulator along a y-axis of the manipulator, and to specify a rotation of the manipulator about the y-axis of the manipulator. The second input arrangement is aligned along a second main axis of the operating device.

The operating device further has a third input arrangement. It is configured to specify a movement of the manipulator along a z-axis of the manipulator, and to specify a rotation of the manipulator about the z-axis of the manipulator. The third input arrangement is aligned along a third main axis of the operating device.

A person skilled in the art knows that the movement of the manipulator along one of the x-, y-, or z-axis can be present as translational movement which does not comprise a turn or a rotation.

The x-axis, y-axis, and z-axis of the manipulator are orthogonal to one another. Thereby, the x-axis, y-axis, and z-axis of the manipulator are orthogonal to one another particularly in the right-handed system. Furthermore, the main axes of the operating device are substantially at a right angle to one another.

In accordance with their active movement in the Cartesian space, the input arrangements can thus be arranged and aligned on the operating device in the form of a coordinate system. The third input arrangement, which is configured for the translational adjustment of the manipulator in z-direction, is, for example, arranged such that this third input arrangement is clearly visually made to connect to the z-axis by the operator. By actuating the third input arrangement, it is, for example, possible to specify a positive z-movement of the manipulator. The clear assignment is based on the substantially right-angled arrangement of the third input arrangement relative to the first and second input arrangement.

The arrangement of the input arrangements along the three main axes of the operating device, which lie substantially at a right angle to one another, allows the operator to be able to intuitively move a multi-axis manipulator in all degrees of freedom. The specific arrangement of the input arrangements reduces operating errors, such as the risk of confusing the directions of movement or the movement orientation, to a minimum. The resulting movements of the manipulator are very well predicable and controllable.

The main axes arrangement of the operating device preferably corresponds to the x-, the y-, and z-axis arrangement of the manipulator. For the operator, it is not only directly apparent which input arrangement relates to which degree of freedom of the manipulator but which direction of movement is the actual result of the actuation. A confusion of the axes and the directions of movement is limited to a minimum.

Preferably, the first input arrangement is provided in a first housing with elongated design. Said housing extends along the first main axis of the operating device. The second input arrangement is preferably provided in a second housing with elongated design. Said second housing extends along the second main axis of the operating device. The third input arrangement is preferably provided in a third housing with elongated design. Said third housing extends along the third main axis of the operating device. The three housings with elongated design, which lie substantially at a right angle to one another, thus clearly illustrate to the operator the shape of the orthogonal coordinate system which is the basis of the operating device or the control unit of the manipulator.

The simple basic design of the operating device allows for a cost-effective control of the manipulator. For the user, the manipulator coordinate system with its associated movements is intuitively comprehensible and reliably controllable.

Preferably, the first, second, and third input arrangement each comprises an operable movement specification element which is designed to specify the movement of the manipulator, and an operable rotation specification element which is designed to specify the rotation of the manipulator. Therefore, one movement specification element and one rotation specification element are located along each of the three main axes of the operating device. With these specification elements, it is possible to specify the movement of the manipulator along the x-, y-, and z-axis, i.e. a translation, and the rotation about these axes. Due to the specific arrangement of the specification elements, the operator can directly and intuitively recognize how a desired movement or rotation of the manipulator is executed. Particularly preferably, one or more of the movement specification elements or rotation specification elements can be completely or partially covered. An operator is thus not able or is not less easily able to reach and actuate the respective specification element. The cover or the degree of coverage can be changed manually or automatically. It is thus possible to ensure the clarity of the operating device by covering specific specification elements.

Particularly preferably, each of the operable movement specification elements is rotatably operable. Particularly preferably, each of the operable rotation specification elements is rotatably operable. The movement and rotation specification elements, for example, can be designed so as to be cylindrical, e.g. as a ring, wheel, or cylinder. For the actuation by the operator, the lateral surfaces of these specification elements can be at least partially freely accessible.

Preferably, the operating device is switchable between a fine mode and a coarse mode. In the coarse mode, the operable movement specification elements and the operable rotation specification elements are operable in a freewheeling manner. In the fine mode, a catch mechanism counteracts this freewheeling actuation.

The fine mode thus describes a precision operation. A specification element designed, for example, as a cylinder can be decelerated by a catch function. Each further rotation to the next catch effects a defined step motion of the robot, for example, a step motion of 1 mm or a rotation by 1°. This sensitivity can be specified or selected by the operator. This fine mode thus allows for very accurate, precise movements. For example, the catch mechanism can be selectively activated by an electromagnetic influence on the specification elements.

The coarse mode is suitable for an extensive movement of the manipulator. The switch between the fine mode and the coarse mode, for example, can be made by the push of a button. As a result, the catch mechanism of the specification elements can be neutralized. The specification elements are now freewheelingly operable and, for example, can rotate effortlessly. When the manipulator is set in motion by rotating one of the specification elements, it can, for example, move accordingly as long as the rotation is maintained. The rotation can also continue without further active influence by the operator due to inertia. Alternatively, with a quick turning of the specification element, a continuous movement of the manipulator can be initiated. By briefly tapping the appropriate specification element, the movement, for example, can be stopped. Up to the maximum speed of movement of the manipulator, the speed of the manipulator can depend on the speed of the specification element itself. As a result, the manipulator can be driven in a defined manner to a very remote position or pose with efficiency and without great effort by the operator.

Since the input arrangements arranged in three coordinate directions refer to a firmly defined coordinate system, the operator can preferably explicitly select which coordinate system must be used. For example, a stationary coordinate system, such as the so-called base coordinate system, the global coordinate system, or the robot coordinate system can be selected for that purpose. However, a moving coordinate system, such as the flange coordinate system or the tool coordinate system can also be selected. Advantageously, the operator holds the operating device such that the selected coordinate directions and the orientation of the operating device roughly coincide.

The operating device preferably has a handle. With one hand, an operator can grip the handle and operate the input arrangements with the other hand. Preferably, the first, second, and third input arrangement are provided jointly movable relative to the handle. The three input arrangements, which can be immovable or rigid relative to one another, can, for example, be rotatably connected to the handle. By rotating the input arrangements relative to the handle, an operator can adjust the direction or alignment of the input arrangement specifically to the desired coordinate direction that is present in the manipulator. As a result, the comfort of the intuitive input can be maintained. The orientation of the input arrangements relative to the handle, for example, can be firmly secured after the adjustment.

In addition to the handle, the operating device preferably has an additional 6D sensor unit. This 6D sensor unit is provided between the handle and the input arrangements, and is designed to detect a relative movement between the handle and one of the input arrangements. An operator can thus, for example, push forward one or more input arrangement(s) relative to the handle. The resulting force can be detected by the 6D sensor unit and a corresponding translation can be specified for the control unit of the manipulator. It is thus easy to effect a multidimensional movement of the manipulator. Subsequently, the user can actuate the movement and rotation specification elements in order to specify a precise movement of the manipulator to the desired target position. The 6D sensor unit can, for example, be based on strain gauges.

Preferably, the operating device also has a 3D inertial sensor unit. Said 3D inertial sensor unit is configured to detect an absolute alignment and orientation of the operating device in relation to the environment. For example, with the 3D inertial sensor unit, the x-alignment of the operating device, which was freely determined by the operator, can be detected, which can be provided to the control unit of the manipulator. A movement specification with the operating device along this freely determined x-alignment can thus be converted into an analogous movement of the manipulator in the same direction. Therefore, a synchronization of the coordinate systems by the user is no longer required.

The operating device, for example, can be designed as a handheld operating device and have further manipulator-specific or safety-relevant operating buttons. For example, the operating device can have one or more emergency stop and/or enabling switches. The operating device can be provided to be cordless or corded. In addition, the operating device can be coupled with other devices by means of a coupling means. For example, the operating device can be coupled with a Smartphone or other (manipulator) control units. As a result, the operating device is universally usable.

The invention further relates to a manipulator system, comprising a manipulator with six degrees of freedom that can be controlled independently from one another, and a previously described operating device for controlling or programming the manipulator.

4. BRIEF DESCRIPTION OF THE DRAWINGS

In the following, the present invention shall be described in more detail with reference to the attached drawings. In the drawings, similar features are denoted with similar reference signs.

5. DESCRIPTION OF PREFERRED EMBODIMENTS

Figure 1:
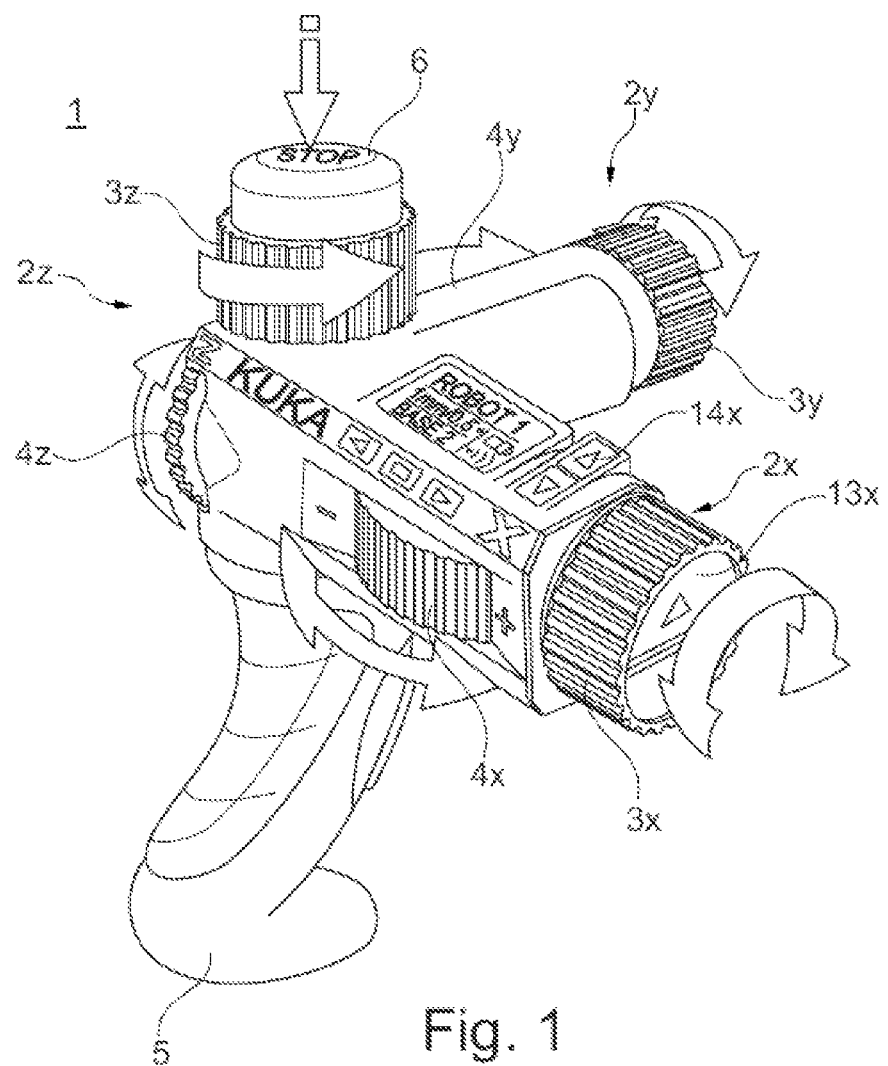
FIG. 1 shows an operating device according to an embodiment.

FIG. 1 shows an operating device 1 which can be used for controlling or programming a manipulator 9 according to the present invention. The operating device 1 comprises a handle 5 which is held by an operator. The operating device 1 further comprises three input arrangements $2x$, $2y$, $2z$ which are aligned along the three main axes of the operating device 1. For example, the input arrangement $2x$ extends in a first main axis to the right, and the second input arrangement $2y$ extends at a right angle to said first main axis. The third input arrangement $2z$ is arranged along the third, in this case the vertical, main axis.

Each of the input arrangements $2x$, $2y$, $2z$ comprises an operable movement specification element $4x$, $4y$, $4z$. These are designed in the form of rotatably operable wheels. If, for example, the wheel $4x$ is rotated in the plus-direction, the manipulator 9 moves in the positive x-direction of its coordinate system. The same applies to movements along the y- and z-axis of the manipulator 9, which can be controlled by actuating the corresponding wheels $4y$ and $4z$.

Each of the input arrangements further comprises a rotatably operable rotation specification element $3x$, $3y$, $3z$ which are designed in the form of rotatably operable wheels. For example, by rotating the wheel $3x$, a rotation of the manipulator 9 about the x-axis of the coordinate system of the manipulator is controlled. The same applies for rotations about the y- and z-axis of the manipulator, which can be controlled by actuating the wheels $3y$ and $3z$. In addition, an emergency stop switch 6 is provided on the rotation element $3z$. Said emergency stop switch 6 makes it possible to initiate an immediate emergency stop of the manipulator 9.

Due to the geometric arrangement of the input arrangements $2x$, $2y$, $2z$, the operator immediately recognizes, how a desired movement of the manipulator 9 can be specified by means of the operating device 1. If the operator wants to specify a rotation of the manipulator 9 about the x-axis of the manipulator, the operator immediately recognizes that, due to the arrangement of the operating device 1, the wheel $3x$ must be actuated for that purpose.

Additionally, pushbuttons $13x$, $14x$ are provided on the operating device 1. In the depicted embodiment, they are provided on the input arrangement $2x$. By actuating the pushbutton $13x$, the step range or sensitivity of the rotatably operable rotation specification element $3x$ can be adjusted. Similarly, by actuating the pushbutton $14x$, the step range or sensitivity of the operable movement specification element $4x$ can be adjusted. Similar pushbuttons (not depicted) can also be provided on the other input arrangements $2y$, $2z$, and so the sensitivity of one or more of the movement or rotation specification elements can be adjusted user-specifically.

Figure 2:
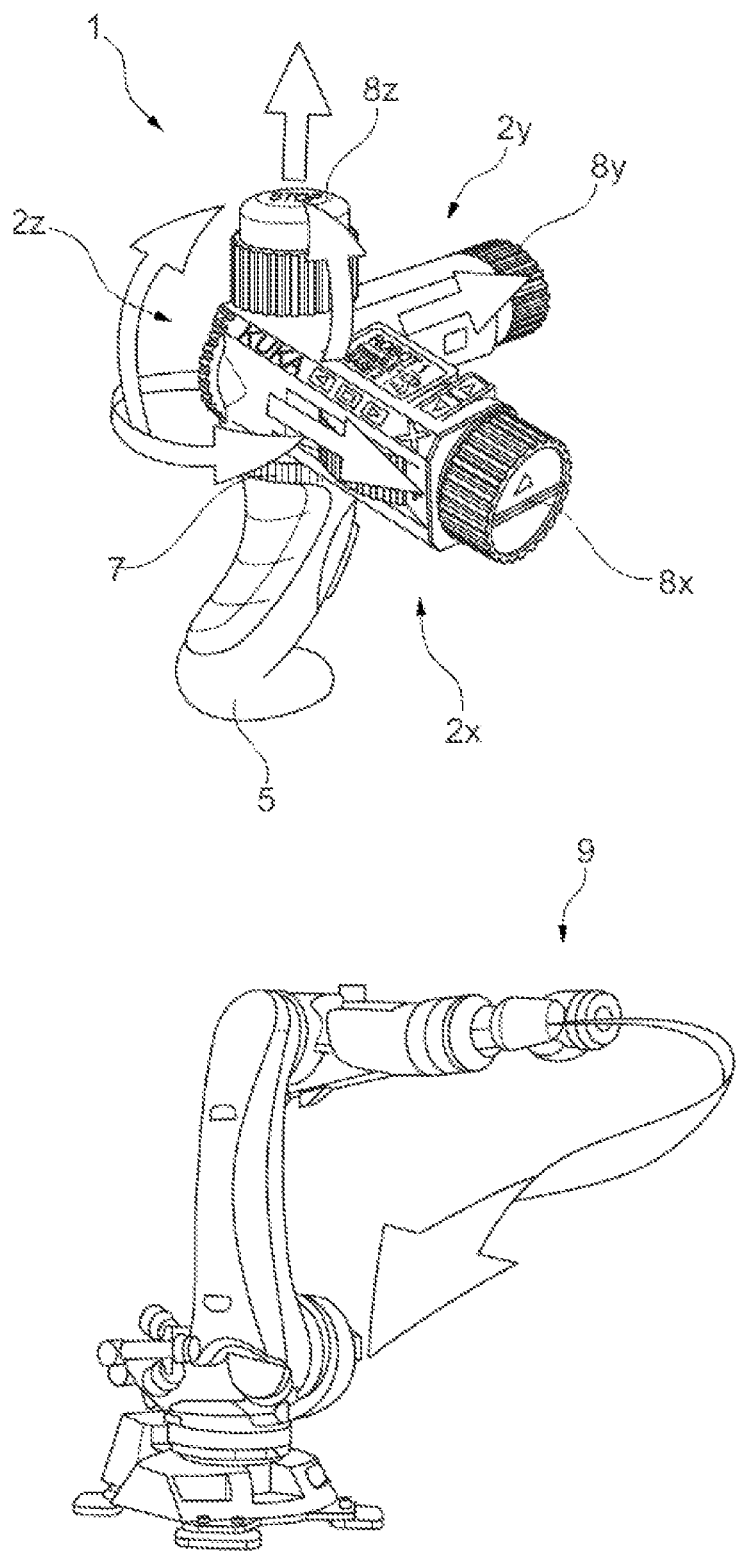
FIG. 2 shows an operating device according to a further embodiment.

FIG. 2 shows an operating device 1 according to a further embodiment, with which the movement of a manipulator 9 is specified. A 6D sensor unit 7 is provided between the handle 5 and the input arrangements $2x$, $2y$, $2z$. If the input arrangements $2x$, $2y$, $2z$ are moved jointly relative to the handle 5, for example, are pulled, pressed, or tilted, this relative movement is detected by the 6D sensor unit 7 and eventually converted into a corresponding movement of the manipulator 9. As a result, travel movements of the manipulator can be specified very intuitively.

At their ends, the input arrangements $2x$, $2y$, $2z$ of the operating device 1 in FIG. 2 have knobs $8x$, $8y$, $8z$, which represent integral movement and rotation specification elements. The knobs $8x$, $8y$, $8z$ can be rotated as well as moved linearly. For a linear movement, the knobs $8x$, $8y$, $8z$ can be pulled out or pushed in along the corresponding main axis of the operating device in order to specify, for example, a linear movement of the manipulator 9 along the corresponding axis. By rotating the knobs $8x$, $8y$, $8z$, for example, a rotation of the manipulator 9 about a corresponding axis can be specified.

LIST OF REFERENCE SIGNS

1 Operating device
$2x$, $2y$, $2z$ Input arrangements
$3x$, $3y$, $3z$ Rotation specification elements
$4x$, $4y$, $4z$ Movement specification elements
5 Handle
6 Emergency stop switch
7 6D sensor unit
$8x$, $8y$, $8z$ Movement and rotation specification element
9 Manipulator
$13x$, $14x$ Pushbuttons

The invention claimed is:

1. An operating device for controlling or programming a manipulator with six degrees of freedom that can be controlled independently from one another, having:
 a first input arrangement which is configured to specify a movement of the manipulator along an x-axis of the manipulator, and to specify a rotation of the manipulator about the x-axis of the manipulator, wherein the first input arrangement is aligned along a first main axis of the operating device;
 a second input arrangement which is configured to specify a movement of the manipulator along a y-axis of the manipulator, and to specify a rotation of the manipulator about the y-axis of the manipulator, wherein the second input arrangement is aligned along a second main axis of the operating device; and
 a third input arrangement which is configured to specify a movement of the manipulator along a z-axis of the manipulator, and to specify a rotation of the manipulator about the z-axis of the manipulator, wherein the third input arrangement is aligned along a third main axis of the operating device,
 wherein the x-axis, y-axis, and z-axis of the manipulator are orthogonal to one another,
 wherein the main axes of the operating device are substantially at right angles to one another, and
 wherein the first, second, and third input arrangements each comprise an operable movement specification element for specifying the movement of the manipulator and an operable rotation specification element for specifying the rotation of the manipulator, each operable movement specification element and operable rotation specification element operating independently to control one of the six degrees of freedom of the manipulator.

2. The operating device according to claim 1, wherein an arrangement of the main axes of the operating device corresponds to the x-, y-, and z-axis arrangement of the manipulator.

3. The operating device according to claim 1,
 wherein the first input arrangement is provided in a first housing with elongated design, and said first housing extends along the first main axis of the operating device,
 wherein the second input arrangement is provided in a second housing with elongated design, and said second housing extends along the second main axis of the operating device, and
 wherein the third input arrangement is provided in a third housing with elongated design, and said third housing extends along the third main axis of the operating device.

4. The operating device according to claim 1, wherein each of the operable movement specification elements is rotatably operable.

5. The operating device according to claim 1, wherein each of the operable rotation specification elements is rotatably operable.

6. The operating device according to claim 1, wherein the operating device is switchable between a fine mode and a coarse mode, wherein in the coarse mode, the operable movement specification elements and the operable rotation specification elements are operable in a freewheeling manner, and wherein in the fine mode, a catch mechanism counteracts this freewheeling actuation.

7. The operating device according to claim 1, further comprising a handle, and wherein the first, second, and third input arrangement are provided jointly movable relative to the handle.

8. The operating device according to claim 1, further comprising:
 a handle; and
 a 6D sensor unit provided between the handle and the input arrangements,
 wherein the 6D sensor unit is configured to detect a relative movement between the handle and one of the input arrangements.

9. The operating device according to claim 1, further comprising:
 a 3D inertial sensor unit configured to detect an absolute alignment and orientation of the operating device in relation to the environment.

10. A manipulator system, comprising:
 a manipulator having six degrees of freedom that can be controlled independently from one another; and
 an operating for controlling or programming the manipulator, the operating device comprising:
  a first input arrangement which is configured to specify a movement of the manipulator along an x-axis of the manipulator , and to specify a rotation of the manipulator about the x-axis of the manipulator, wherein the first input arrangement is aligned along a first main axis of the operating device;
  a second input arrangement which is configured to specify a movement of the manipulator along a y-axis of the manipulator, and to specify a rotation of the manipulator about the y-axis of the manipulator, wherein the second input arrangement is aligned along a second main axis of the operating device; and
  a third input arrangement which is configured to specify a movement of the manipulator along a z-axis of the manipulator, and to specify a rotation of the manipulator about the z-axis of the manipulator, wherein the third input arrangement is aligned along a third main axis of the operating device,
  wherein the x-axis, y-axis, and z-axis of the manipulator are orthogonal to one another,
  wherein the main axes of the operating device are substantially at right angles to one another, and
  wherein the first, second, and third input arrangements each comprise an operable movement specification element for specifying the movement of the manipulator and an operable rotation specification element for specifying the rotation of the manipulator, each operable movement specification element and operable rotation specification element operating independently to control one of the six degrees of freedom of the manipulator.

11. The manipulator system according to claim 10, wherein a main axis arrangement of the operating device corresponds to the x-, y-, and z-axis arrangement of the manipulator.

12. The manipulator system according to claim 10,
 wherein the first input arrangement is provided in a first housing with elongated design, and said first housing extends along the first main axis of the operating device,
 wherein the second input arrangement is provided in a second housing with elongated design, and said second housing extends along the second main axis of the operating device, and wherein the third input arrangement is provided in a third housing with elongated design, and said third housing extends along the third main axis of the operating device.

13. The manipulator system according to claim 10, wherein each of the operable movement specification elements is rotatably operable.

14. The manipulator system according to claim 10, wherein each of the operable rotation specification elements is rotatably operable.

15. The manipulator system according to claim 10, wherein the operating device is switchable between a fine mode and a coarse mode, wherein in the coarse mode, the operable movement specification elements and the operable rotation specification elements are operable in a freewheeling manner, and wherein in the fine mode, a catch mechanism counteracts this freewheeling actuation.

16. The manipulator system according to claim 10, wherein the operating device further comprises a handle, and wherein the first, second, and third input arrangement are provided jointly movable relative to the handle.

17. The manipulator system according to claim 10, wherein the operating device further comprises:
   a handle; and
   a 6D sensor unit provided between the handle and the input arrangements,
   wherein the 6D sensor unit is configured detect a relative movement between the handle and one of the input arrangements.

18. The manipulator system according to claim 10, wherein the operating device further comprises:
   a 3D inertial sensor unit configured to detect an absolute alignment and orientation of the operating device in relation to the environment.

* * * * *